United States Patent
Kojima et al.

(10) Patent No.: US 12,399,145 B2
(45) Date of Patent: Aug. 26, 2025

(54) ION SENSOR, ION SENSOR MANUFACTURING METHOD, AND ION MEASUREMENT METHOD

(71) Applicant: SYSMEX CORPORATION, Kobe (JP)

(72) Inventors: Junko Kojima, Kobe (JP); Kenichi Uchiyama, Kobe (JP); Sayaka Hongo, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 9 days.

(21) Appl. No.: 18/397,620

(22) Filed: Dec. 27, 2023

(65) Prior Publication Data

US 2024/0133838 A1 Apr. 25, 2024
US 2024/0230580 A9 Jul. 11, 2024

Related U.S. Application Data

(63) Continuation of application No. PCT/JP2022/015516, filed on Mar. 29, 2022.

(30) Foreign Application Priority Data

Jul. 2, 2021 (JP) .................................. 2021-111142

(51) Int. Cl.
G01N 27/333 (2006.01)
G01N 27/30 (2006.01)

(52) U.S. Cl.
CPC ....... G01N 27/3335 (2013.01); G01N 27/301 (2013.01)

(58) Field of Classification Search
CPC .......................... G01N 27/3335; G01N 27/301
See application file for complete search history.

(56) References Cited

U.S. PATENT DOCUMENTS

| 5,308,468 A | 5/1994 | Katoh et al. |
| 9,874,539 B2 | 1/2018 | Hu et al. |

(Continued)

FOREIGN PATENT DOCUMENTS

| EP | 4235163 A1 | 8/2023 |
| JP | H04-19554 A | 1/1992 |

(Continued)

OTHER PUBLICATIONS

Komaba et al., All-solid-state ion-selective electrodes with redox-active lithium, sodium, and potassium insertion materials as the inner solid-contact layers, Analyst, 2017, 142, 3857 (Year: 2017).*

(Continued)

*Primary Examiner* — Luan V Van
*Assistant Examiner* — Shizhi Qian
(74) *Attorney, Agent, or Firm* — METROLEX IP LAW GROUP, PLLC; Robert L. Scott, Esq.

(57) ABSTRACT

An ion sensor is disclosed that includes an ion selective electrode including a first internal solid layer including a first insertion material, and a first ion conductive ceramic, an ion selective membrane provided on the first internal solid layer, a reference electrode including a second internal solid layer including a second insertion material, and a second ion conductive ceramic, an ionic liquid containing membrane provided on the second internal solid layer, and an insulator on which the ion selective electrode and the reference electrode are arranged.

19 Claims, 10 Drawing Sheets

(56) References Cited

U.S. PATENT DOCUMENTS

| | | | |
|---|---|---|---|
| 2002/0038762 A1* | 4/2002 | Eventov | G01N 27/4035 204/418 |
| 2009/0283404 A1* | 11/2009 | Kakiuchi | G01N 27/401 204/435 |
| 2010/0193376 A1* | 8/2010 | Rius Ferrus | G01N 27/3335 204/414 |
| 2013/0153417 A1* | 6/2013 | Shibata | G01N 27/301 204/414 |
| 2018/0024087 A1 | 1/2018 | Hu et al. | |
| 2018/0128770 A1* | 5/2018 | Lindner | C08J 5/18 |
| 2018/0246054 A1 | 8/2018 | Ishige et al. | |
| 2019/0195824 A1 | 6/2019 | Speck | |
| 2020/0064307 A1 | 2/2020 | Lee et al. | |

FOREIGN PATENT DOCUMENTS

| | | |
|---|---|---|
| JP | 9-178690 A | 7/1997 |
| JP | 5036003 B2 | 9/2012 |
| JP | 5356336 B2 | 12/2013 |
| JP | 5356337 B2 | 12/2013 |
| JP | 2018018578 A * | 2/2018 |
| JP | 2019-194618 A | 11/2019 |
| WO | 2008/032790 A1 | 3/2008 |
| WO | 2017/047374 A1 | 3/2017 |
| WO | 2021/140933 A1 | 7/2021 |

OTHER PUBLICATIONS

Wang et al., All-solid-state blood calcium sensors based on screen-printed poly(3,4-ethylenedioxythiophene) as the solid contact, Sensors and Actuators B, 2012, 173, 630-635 (Year: 2012).*

Ikejiri et al., English translation of JP2018018578A, 2018 (Year: 2018).*

Kojima et al., An integrated glucose sensor with an all-solid-state sodium ion-selective electrode for a minimally invasive glucose monitoring system, Micromachines, 2015, 6, 831-841 (Year: 2015).*

Mousavi et al., Sensors and Actuators B. Chemical, "Ionic liquid-based reference electrodes for miniaturized ion sensors: What can go wrong?", Dec. 12, 2019, pp. 1-8, vol. 301, No. 127112, Elsevier B.V.

Hu et al., Angewandte Chemie, "A Disposable Planar Paper-Based Potentiometric Ion-Sensing Platform", First published, May 17, 2016, pp. 7670-7673, Wiley-VCH, Weinheim, Germany.

Hu et al., ACS Applied Nano Materials, "Paper-Based All-Solid-State Ion-Sensing Platform with a Solid Contact Comprising Colloid-Imprinted Mesoporous Carbon and a Redox Buffer", Jan. 2018, pp. 293-301, ACS Publications, Washington DC; Cited in the Specification.

Kojima et al., Electrochimica Acta, "Influence of solid electrolyte upon the repeatability and reproducibility of all-solid-state ion-selective electrodes with inorganic insertion material paste", Mar. 20, 2021, pp. 1-7, vol. 373, No. 137896, Elsevier Ltd.; Cited in the ISR.

The International Search Report("ISR") of PCT/JP2022/015516 mailed on Jun. 21, 2022.

Kojima et al., "Application of a novel ionic-liquid-based membrane reference electrode with inorganic insertion material paste to a calibration-free all-solid-state ion sensor chip", Sensors and Actuators B: Chemical, vol. 347, Aug. 18, 2021 XP086781417, ISSN: 0925-4005, DOI: 10.1016/J.SNB.2021.130625, [retrieved on Aug. 18, 2021] Elsevier BV, NL; Cited in EESR issued on May 16, 2025 in a counterpart European patent application No. 22832541.1.

The extended European search report (EESR) issued on May 16, 2025, in a counterpart European patent application No. 22832541.1.

* cited by examiner

FIG. 5
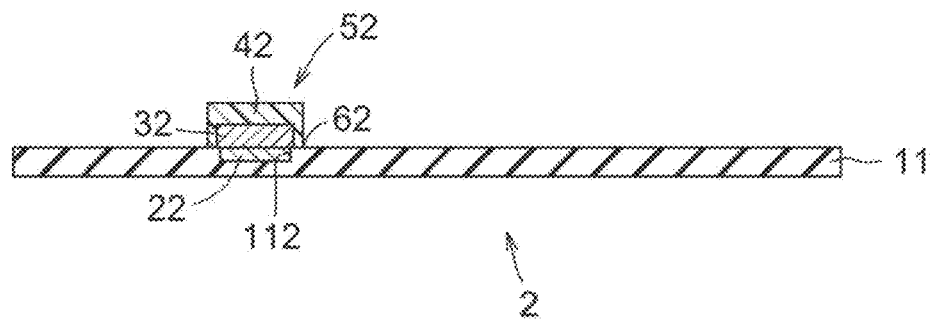
FIG. 6A
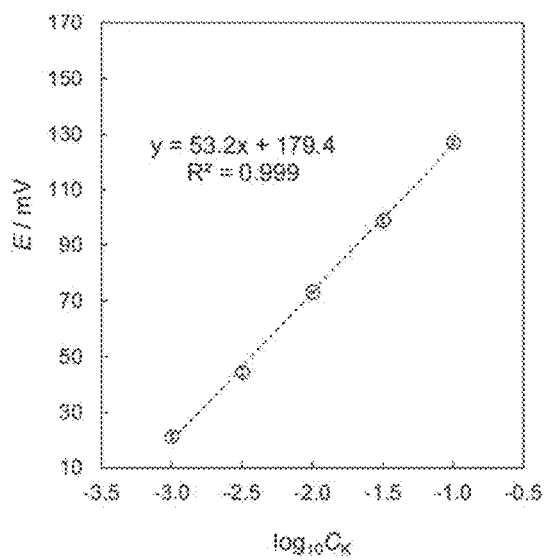
FIG. 6B
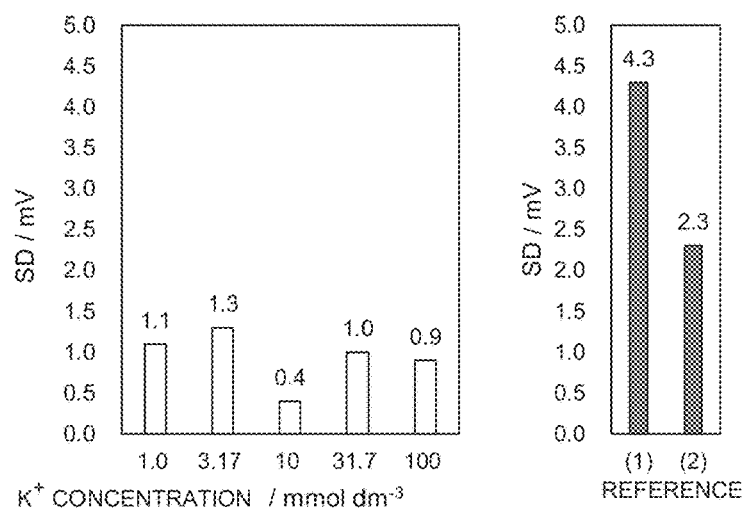
FIG. 6C

FIG. 7A
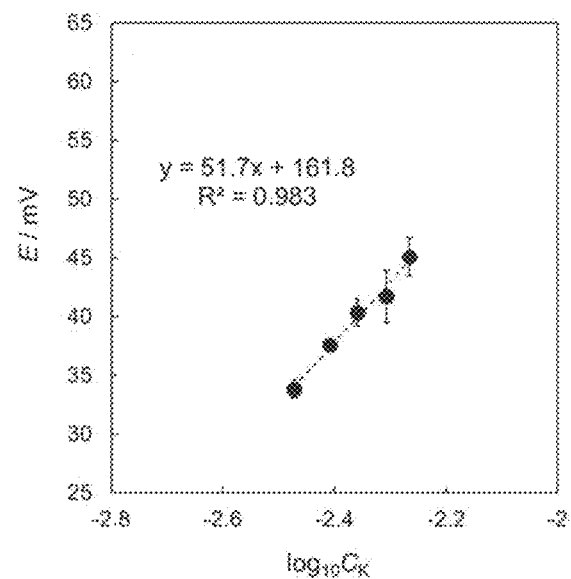
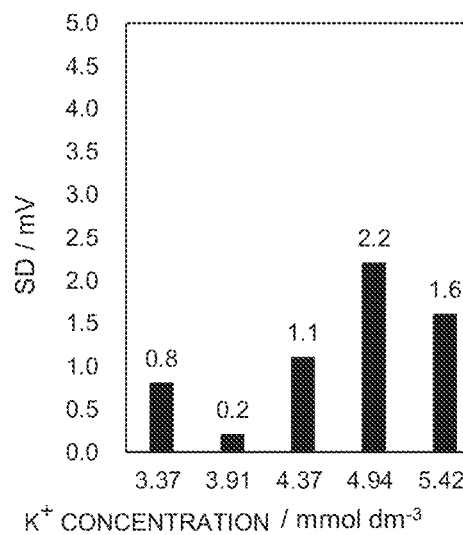
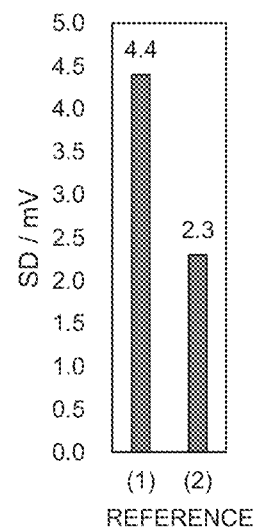
FIG. 7B
FIG. 7C

ION SENSOR, ION SENSOR MANUFACTURING METHOD, AND ION MEASUREMENT METHOD

CROSS REFERENCE TO RELATED APPLICATIONS

This application is a continuation application of International Application No. PCT/JP2022/015516, filed on Mar. 29, 2022, which claims priority based on the Article 8 of Patent Cooperation Treaty from prior Japanese Patent Application No. 2021-111142, filed on Jul. 2, 2021, the entire contents of which are incorporated herein by reference.

BACKGROUND

The disclosure relates to an ion sensor, a method for manufacturing an ion sensor, and a method for measuring ions.

In a related art, Ion sensors that measure ions by potentiometry are known. Ion sensors include an ion selective electrode, which is the working electrode, and a reference electrode, both of which have long been used with internal liquids. For example, a reference electrode with a concentrated KCl (Potassium Chloride) solution of saturated concentration or about 3 Mol/L as an internal liquid in contact with an Ag/AgCl electrode is often used as a reference electrode. Internal liquid-based ion sensors using an internal liquid contain a high concentration of ion electrolyte to prevent the concentration of the internal liquid from changing. For this reason, maintenance process of ion sensor may be complicated due to problems such as contamination of the sample solution and clogging due to crystallization in the liquid-filled area. In addition, when liquid is used inside the electrode, the structure becomes complicated, making it unsuitable for mass production.

To solve the above problems, all-solid-state ion sensors that do not use internal liquid for either the ion selective electrode or the reference electrode are known. Although all-solid-state ion sensors are suitable for mass production because they do not use an internal liquid, they have the problem of large potential variations among ion sensors. If the potential variation among ion sensors is large, it becomes necessary to pre-calibrate the sensors with a calibration liquid before use. ACS Appl. Nano Mater. 2018, 1, 293-301 (Non-patent literature 1) is an example of a related art.

SUMMARY

Non-patent literature 1 discloses an all-solid-state ion sensor using CIM (Colloidally imprinted mesoporous) carbon as the internal solid layer. In order to be calibration free, the ion sensor of Non-Patent Document 1 uses $[Co^{III}(C_9, C_9\text{-bipy})_3]$ (tris (pentafluorophenyl) borane)$_2$, $[Co^{III}(C_9,C_9\text{-bipy})_3]$ (tris (pentafluorophenyl) borane)$_3$, or potassium-tetracyanoquinodimethane complex salt in the electrode. However, $[Co^{III}(C_9,C_9\text{-bipy})_3]$ (tris (pentafluorophenyl) borane)$_2$, $[Co^{III}(C_9,C_9\text{-bipy})_3]$ (tris (pentafluorophenyl) borane)$_3$, or potassium-tetracyanoquinodimethane complex salt leach into the sample solution, the leached components cause variations in the potential of the ion sensor.

One or more embodiments may provide an ion sensor, a method for manufacturing an ion sensor, and a method for measuring ions, in which the variation in potential is reduced.

In view of the above problem, the inventor has conducted a diligent study and found an ion selective electrode including a first internal solid layer containing a first insertion material and a first ion conductive ceramic, an ion selective membrane provided on the first internal solid layer, a second insertion material and a second ion, a reference electrode including a second internal solid layer containing a second insertion material and a second ion conductive ceramic, and an ion liquid containing membrane provided on the second internal solid layer, and an insulator on which the ion selective electrode and the reference electrode are provided, and a method for manufacturing the ion sensor and a method for measuring ions may solve the above problems. The method of manufacturing the ion sensor and the method of measuring ions may solve the above-mentioned problems.

According to one or more embodiments, it may be possible to provide an ion sensor, a method for manufacturing an ion sensor, and a method for measuring ions with reduced potential variation.

BRIEF DESCRIPTION OF DRAWINGS

FIG. 5 is a diagram illustrating a cross-sectional view of an ion sensor in Example 3.

FIGS. 6A, 6B and 6C are diagrams illustrating a KCl measurement performance results in Example 4. A potential E for each ion selective electrode was measured. FIG. 6A is a diagram illustrating a calibration curve for an ion selective electrode relative to a reference electrode. $c_K$ indicates the $K^+$ concentration (mol dm$^3$). FIG. 6B is a diagram illustrating a standard deviation of a potential in each KCl solution. FIG. 6C is a diagram illustrating, as reference values. (1) shown in FIG. 6C is a potential standard deviation of an all-solid-state ion sensor from a non-patent literature, and (2) shown in FIG. 6C is the potential standard deviation allowed for potassium ion measurements in the US federal regulation, 42 CFR § 493.931—Routine chemistry.

FIGS. 7A, 7B and 7C are diagrams illustrating serum measurement performance results in Example 5. Potential E was measured for each ion selective electrode. FIG. 7A is a diagram illustrating a calibration curve for an ion selective electrode relative to a reference electrode. $c_K$ indicates $K^+$ concentration (mol dm$^3$). FIG. 7B is a diagram illustrating a standard deviation of a potential in each serum. FIG. 7C is a diagram illustrating, as reference values. (1) shown in FIG. 7C is the potential standard deviation of the all-solid-state ion sensor from non-patent literature and (2) shown in FIG. 7C is the potential standard deviation allowed for potassium ion measurements in the US federal regulation, 42 CFR § 493.931—Routine chemistry.

DETAILED DESCRIPTION

1. Ion Sensor

Figure 1A:
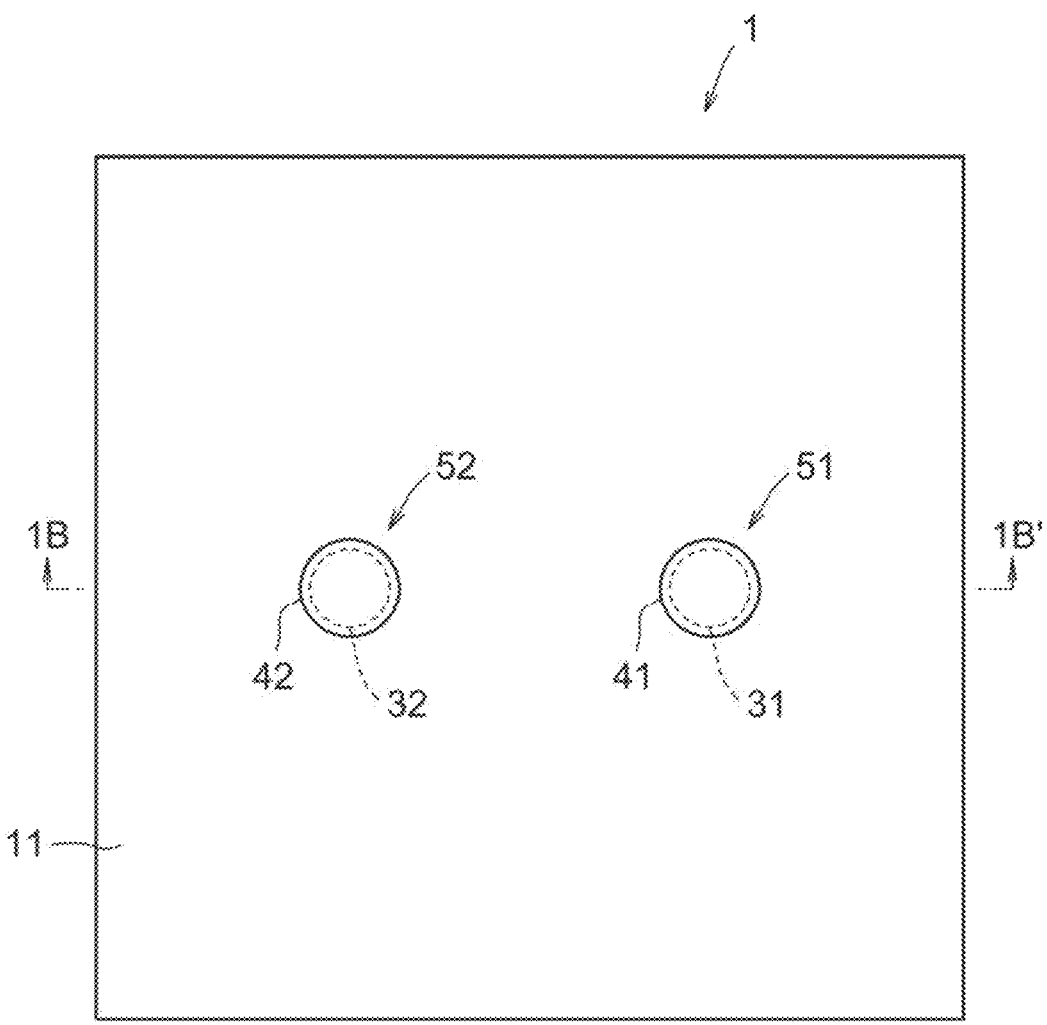
FIG. 1A is a diagram illustrating a plan view of an ion sensor obtained in Example 1.

One or more embodiments relate to an ion sensor may include an ion selective electrode including a first internal solid layer containing a first insertion material and a first ion conductive ceramic, an ion selective membrane provided on the first internal solid layer, a reference electrode including a second internal solid layer containing a second insertion material and a second ion conductive ceramic and an ion liquid containing membrane provided on the second internal solid layer, and an insulator on which the ion selective electrode and the reference electrode are provided. This is described below.

In the following description, the "first insulating material" and the "second insulating material" may be collectively referred to as the "insulating material. The "first ion conductive ceramic" and "second ion conductive ceramic" are sometimes collectively referred to as "ion conductive ceramic," and the "first internal solid layer" and "second internal solid layer" are sometimes collectively referred to as "internal solid layers.

The "first insulating material" and the "second insulating material" may be the same or different. The "first ion conductive ceramic" and the "second ion conductive ceramic" may be the same or different. The "first internal solid layer" and the "second internal solid layer" may be the same or different.

The internal solid layer is a layer containing an insertion material and ion conductive ceramic.

Insertion materials are not restricted as long as they are materials that may be used for ion sensor electrodes. As an insertion material, one that may suitably insert (insertion) and remove measured ions within the structure by electrochemical reaction (ion electron conductor) may be used.

In this specification, the measurement ions are not restricted, but include, for example, potassium ions, sodium ions, lithium ions, calcium ions, magnesium ions, etc., preferably potassium ions, sodium ions, lithium ions, etc., particularly preferably potassium ions.

It may be preferable that the insertion material is an inorganic insertion material. Inorganic insertion materials are not restricted as long as they are inorganic materials that may be used for the electrodes of ion sensors.

Specific examples of insertion materials include, for example, metal oxides, oxygen redox materials, Prussian blue analogues, and the like. These may be selected as appropriate for the measured ions.

Metal oxides, for example, $M_xMnO_2$, $M_xNiO_2$, $M_xCoO_2$, $M_xNi_{0.5}Mn_{0.5}O_2$, $M_xFaO_2$, $M_{2/3}Fe_{1/3}Mn_{2/3}O_2$, $M_xNi_{1/3}Co_{1/3}Mn_{1/3}O_2$, $M_xNi_{0.5}Ti_{0.5}O_2$, $M_xVO_2$, $M_xCrO_2$, $M_xFePO_4$ (in formula, M is each independently and Na or K, and x represents any positive number) and others. Among these, $M_xMnO_2$ is more preferred, and $Na_xMnO_2$ is especially preferred.

x may usually be $0<x\leq1$. It may be preferable that x is 0.15-0.66, more preferably 0.2-0.5, more preferably 0.22-0.28, 0.30-0.36, or 0.41-0.47, especially preferably 0.245-0.255, 0.325-0.335, or 0.435-0.445.

The crystal structure of the metal oxide is not restricted as long as it may be used as an electrode for ion sensors. The crystal structures include, for example, a rectangular crystal structure, a tetragonal crystal structure, a tetragonal crystal structure, a hexagonal crystal structure, a cubic crystal structure, a triclinic crystal structure, a monoclinic crystal structure, and the like, of which the rectangular crystal structure is preferred.

Oxygen redox materials are materials that may utilize redox reactions of oxide ions as well as transition metals, and are not limited in this respect. Specific examples of oxygen redox materials include $Na_2Mn_3O_7$, $Na_{2/3}Mg_{0.28}Mn_{0.72}O_2$, $Na_2RuO_3$, $Na_{1.3}Nb_{0.3}Mn_{0.4}O_2$, $Na_{0.6}Li_{0.2}Mn_{0.8}O_2$ etc.

Prussian blue analogues are structures in which cyano groups cross-link transition metal ions, and are not limited in this respect. Prussian blue analogues specifically include, for example, $Na_2Mn[Fe(CN)_6]$, $Na_yCO[Fe(CN)_6]_{0.90} \cdot 2.9H_2O$ (in the formula, y indicates any positive number) K—FeHCF (potassium iron hexacyanoferrate), K—NiHCF (potassium nickel hexacyanoferrate), K—CuHCF (potassium copper hexacyanoferrate), Na—NiHCF (sodium nickel hexacyanoferrate), Ca—NiHCF (calcium nickel hexacyanoferrate), etc.

The form of the insertion material is not limited, but it may be preferable that the insertion material is particles. The particles of the insertion material may be of any shape, for example, scaly, columnar, spherical, ellipsoidal, etc.

It may be preferable that the average particle size of the particles of the insertion material is from 1 to 20 μm, more preferably from 2 to 15 μm, and even more preferably from 5 to 12 μm, from the viewpoint of enhancing adhesion with the ion conductive ceramic and performance as an electrode of the ion sensor. The average particle size may be measured by a laser diffraction/scattering particle size distribution analyzer.

The material and shape of the insertion material may be one type alone or a combination of two or more types.

The content of the insertion material is, for example, 20 to 70 parts by mass, preferably 25 to 65 parts by mass, more preferably 30 to 60 parts by mass for 100 parts by mass of the internal solid layer.

Ion conductive ceramic is not limited as long as they are solids capable of conducting ions. Ion conductive ceramic may be used that are capable of conducting measured ions.

Ion conductive ceramic includes, for example, potassium ion conductive ceramic, sodium ion conductive ceramic, lithium ion conductive ceramic, calcium conductive ceramic, magnesium conductive ceramic, sodium ion conductive ceramic, lithium ion conductive ceramic, etc., especially potassium ion conductive ceramic.

Ion conductive ceramic may be selected according to the ion being measured. Specific examples of ion conductive ceramic include oxide-based solid electrolytes such as β" alumina, β alumina, perovskite-type oxides, NASICON-type oxides, garnet-type oxides, etc., sulfide-based solid electrolytes, stabilized zirconia, and ion exchangers. The ion exchanger is not restricted as long as it is a substance that exhibits ion exchange phenomena. Examples include zeolite (zeolite may contain internal cations such as Na ions, K ions, and H ions), ion exchange resin acid, etc.

Among ion conductive ceramic, β" alumina, β alumina, zeolite, etc. are particularly preferred from the viewpoint of high water stability and suitable use as electrodes for ion sensors.

β"/β alumina contains a layered structure consisting of an ion conducting layer and spinel blocks, and the migration of ions (measured ions) occurs within the ion conducting layer. β" alumina and β alumina differ in their crystal structures, and of these β" alumina may include a higher sodium ion content in the crystal structure and relatively higher ionic conductivity. β"/β alumina is preferably Na-β"/β alumina to which sodium ions may conduct. Na-β" is usually a substance with a chemical composition of $Na_2O \cdot xAl_2O_3$ (x=5-7). Na-β alumina is also usually a substance whose chemical composition is $Na_2O \cdot xAl_2O_3$ (x=9-11).

The form of the ion conductive ceramic is not restricted, but it may be preferable that they are particles. Particles of ion conductive ceramic may be of any shape, for example, scaly, columnar, spherical, or ellipsoidal.

It may be preferable that the average particle size of the particles of ion conductive ceramic is 0.02 to 3 μm, more preferably 0.1 to 1 μm, and more preferably 0.15 to 0.5 μm. It may be preferable that the average particle size of the ion conductive ceramic particles is 0.02 to 7 μm, more preferably 0.05 to 5 μm, and even more preferably 0.1 to 3 μm in one or more embodiments from the same viewpoint. The average particle size may be measured by a laser diffraction/scattering particle size distribution analyzer.

In the internal solid layer, the average particle size of the ion conductive ceramic should be smaller than the average particle size of the insertion material. Specifically, the average particle size of the ion conductive ceramic relative to the average particle size of the insertion material (=average particle size of the ion conductive ceramic/average particle size of the insertion material) is, for example, 0.001 to 0.3, preferably 0.005 to 0.1, more preferably 0.01 to 0.05. Alternatively, the average particle size of the ion conductive ceramic relative to the average particle size of the insertion material (=average particle size of the ion conductive ceramic/average particle size of the insertion material) is for example 0.001-0.7, preferably 0.005-0.6, more preferably 0.01-0.05.

The ion conductive ceramic material and shape may be a single type or a combination of two or more types.

The ion conductive ceramic content is, for example, 15 to 70 parts by mass, preferably 20 to 65 parts by mass, more preferably 25 to 60 parts by mass, with respect to 100 parts by mass of the internal solid layer.

The mass ratio of the insertion material to the ion conductive ceramic (insertion material:ion conductive ceramic) in the internal solid layer is for example 5:1 to 1:5, preferably 2:1 to 1:2, more preferably 1.5:1 to 1:1.5, even more preferably 1.2:1 to 1:1.2 and even more preferably 1.1:1 to 1:1.1.

It may be preferable that the internal solid layer contains a conductive agent. This improves the conductivity of the internal solid layer, improves the buffering effect against volume changes due to the entry and exit of ions, and improves the reproducibility of measurements.

The conductive agent is not limited, but may include, for example, carbon materials such as carbon black, acetylene black, Ketjen black, carbon nanotubes, graphene, carbon powder, and graphite powder, conductive fibers such as metal fibers, metal powders such as carbon fluoride, aluminum conductive whiskers such as zinc oxide and potassium titanate, conductive metal oxides such as titanium oxide, organic conductive materials such as phenylene derivatives and graphene derivatives, etc. may be used. Among these, carbon materials are preferably used.

The component and shape of the conductive agent may be one type alone or a combination of two or more types.

The conductive agent content is, for example, 0.1 to 20 parts by mass, preferably 1 to 15 parts by mass, more preferably 2 to 10 parts by mass, with respect to 100 parts by mass of the internal solid layer.

The mass ratio of the insertion material to the conductive agent (insertion material:conductive agent) in the internal solid layer is, for example, 20:1 to 1:1, preferably 15:1 to 3:1, more preferably 10:1 to 6:1.

The mass ratio of ion conductive ceramic to conductive agent (ion conductive ceramic:conductive agent) in the internal solid layer is, for example, 20:1 to 1:1, preferably 15:1 to 3:1, more preferably 10:1 to 6:1.

The internal solid layer preferably contains a binding agent. This allows each component in the internal solid layer to be more firmly bound together.

The binding agent is not particularly limited, but may include, for example, polyvinylidene fluoride, polyvinylpyrrolidone, polytetrafluoroethylene, polyethylene, polypropylene, aramid resin, polyamide, polyimide, polyamideimide, polyacrylonitrile, polyacrylic acid, Polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, acrylic emulsion, polyvinyl acetate, Polyvinyl acetate, polyvinyl pyrrolidone, polyether, polyethersulfone, hexafluoropropylene, styrene-butadiene rubber, carboxymethylcellulose, and other polymers, as well as similar compounds having the same backbone as these polymers, and compound agents composed of multiple polymers may be used. Among these, preferably (a) polyvinylidene fluoride, (b) mixtures containing styrene butadiene latex and carboxymethyl cellulose, (c) mixtures containing polyamide, polyimide, and carbodiimide, (d) polytetrafluoroethylene, (e) acrylic emulsions, etc., and more preferably polyvinylidene fluoride.

The components of the binding agent may be a single type or a combination of two or more types.

The content of the binding agent is, for example, 0.1 to 20 parts by mass, preferably 1 to 15 parts by mass, more preferably 2 to 10 parts by mass, with respect to 100 parts by mass of the internal solid layer.

The mass ratio of the insertion material to the binding agent (insertion material:binding agent) in the internal solid layer is for example 20:1 to 1:1, preferably 15:1 to 3:1, more preferably 10:1 to 6:1.

The mass ratio of ion conductive ceramic to sorbent (ion conductive ceramic:sorbent) in the internal solid layer is, for example, 20:1 to 1:1, preferably 15:1 to 3:1, more preferably 10:1 to 6:1.

The internal solid layer may contain other components other than those mentioned above. Other components include, for example, $MnCO_3$, $Na_2CO_3$, $Al_2O_3$, etc.

The total content of the insertion material and ion conductive ceramic in the internal solid layer (in addition, if conductive agents and binding agents are included, the total content including them) is, for example, 70 to 100 parts by mass, preferably 80 to 100 parts by mass, more Preferably 90-100 parts by mass, more preferably 95-100 parts by mass, and even more preferably 99-100 parts by mass.

In the internal solid layer, each component is preferably in a mixed state.

The layer structure of the internal solid layer is not restricted. The internal solid layer may be a monolayer structure consisting of one layer of a single composition, or a multilayer structure consisting of multiple layers of the same or different compositions from each other.

The thickness of the internal solid layer (=length perpendicular to the widest surface of the internal solid layer) is not particularly limited as long as conductivity is not significantly impaired. The thickness is, for example, from 1 to 200 µm. From the viewpoint of manufacturing efficiency, manufacturing cost, etc., the thickness is preferably 1 to 100 µm, more preferably 1 to 50 µm, and even more preferably 1 to 20 µm.

It is preferred that the ingredients blended in the preparation of the first internal solid layer are the same as those blended in the preparation of the second internal solid layer. In this case, the percentage content of each component in the first internal solid layer is, for example, 50-200%, preferably 60-180%, more preferably 70-140%, more preferably 80-120%, with respect to the percentage content of the corresponding component in the second internal solid layer 100%, and within these ranges But preferably from 90 to 110%, more preferably from 95 to 105%, more preferably from 98 to 102%, and especially from 99 to 101%.

In one or more embodiments, it is preferred that the composition of the first internal solid layer and the composition of the second internal solid layer be substantially the same. The term "substantially the same composition" indicates that the compositions are the same except for trace components such as impurities and residual solvents. For example, if the composition of the first internal solid layer and the second internal solid layer are made using the same mixed composition, it may be said that the composition of the obtained first internal solid layer and the composition of the second internal solid layer are substantially the same.

The ion selective electrode includes the first internal solid layer and an ion selective membrane. The ion selective membrane contains an ion selective substance.

Conventional known ionophores or synthetic substances may be widely used as ion selective substances. The ion selective substance may be selected according to the ion to be measured. Ionophores are suitable as ion selective substances. Ionophores include valinomycin, monensin, rhodopsin, nonactin, monactin, ionomycin, gramicidin A, nigericin, CCCP (carbonyl cyanide-m-chlorophenylhydrazone), FCCP (carbonyl cyanide-p trifluoromethoxyphenylhydrazone), and others. Synthetic substances include crown ethers (a group of macrocyclic polyethers) and even acyclic nonylphenoxy polyethanes. The ion selective substance may be a single substance or a combination of two or more substances. Ion selective substances specifically include DD16C5, Bis-12Crown-4, 12-Crown-4, 15-Crown-5, 18-Crown-6, Carex-Allenes, etc.

Ion selective membranes typically contain a binder resin. Binder resins are not particularly limited. Specific examples of the binder resin include polyvinyl chloride, polyvinylidene chloride, polyacrylonitrile, polyurethane, polyvinyl acetate, silicon elastomer, polyvinyl alcohol, cellulose ester, polycarbonate, vinyl chloride/vinyl acetate copolymer, vinyl chloride/vinyl acetate/vinyl alcohol copolymer, vinyl chloride/vinylidene chloride copolymer and the like. The components of the binder resin may be one type alone or a combination of two or more.

It may be preferable that the ion selective membrane contains a plasticizer. The plasticizer enhances the flexibility of the ion selective membrane, and thus, for example, prevents cracking of the ion selective membrane. The plasticizer is not limited, but includes, for example, TEHP (tris (2-ethylhexyl) phosphate), NPOE (2-nitrophenyl octyl ether), DOP (dioctyl phthalate), DOS (dioctyl sebacate), DBE (dibasic acid esters), BA (butyl acrylate), etc. DOS (dioctyl sebacate), DBE (dibasic acid esters), BA (butyl acrylate), etc. The plasticizer may be one type alone or a combination of two or more types.

It may be preferable that the ion selective membrane contains an anion exclusion agent. The anion excluder may be selected according to the measured ion. Anion excluders include, for example, sodium tetrakis (4-chlorophenyl) borate (Na-TCPB), potassium tetrakis (4-chlorophenyl)borate (K-TCPB), sodium tetrakis [3,5-bis (trifluoromethyl) phenyl] borate (Na-TFPB), tetrakis Potassium tetrakis [3,5-bis (trifluoromethyl) phenyl] borate (K-TFPB), potassium tetraphenylborate (K-TPB), sodium tetraphenylborate (Na-TPB), tetrakis [3,5-bis (1,1,3,3,3-hexafluoro-2-methoxy-2 propyl) phenyl] sodium borate and other tetraphenylborate salts. The anion excluding agent component may be a single component or a combination of two or more components.

The content of the above components is not particularly limited as long as the ion selective membrane may function. The content per 100 mass parts of the ion selective membrane is, for example, 1 to 10 parts by mass of ion selective material, 15 to 45 parts by mass of binder resin, 50 to 80 parts by mass of plasticizer, and 0.1 to 5 parts by mass of anion exclusion agent.

The layer structure of the ion selective membrane is not limited. The ion selective membrane may be a monolayer structure consisting of one layer of a single composition, or a bilayer structure consisting of multiple layers of the same or different compositions from each other.

The thickness of the ion selective film (=length perpendicular to the widest surface of the ion selective film) is not particularly limited. The thickness is, for example, 50-300 µm.

The use of the ion selective membrane is not particularly limited, e.g., as a cation selective membrane for sodium ions, potassium ions, etc.

Figure 10:
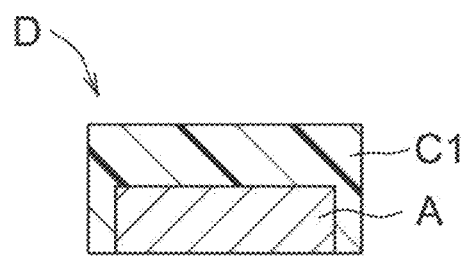
FIG. 10 is a diagram illustrating a schematic cross-sectional view of an example of an ion selective electrode.

The ion selective membranes are placed on the internal solid layer. It may be preferable that the ion selective membrane is placed directly on the internal solid layer. A schematic diagram of an ion selective electrode is shown in FIG. 10. In FIG. 10, the ion selective electrode D may include a two-layer structure, in which the ion selective membrane C1 is placed directly on the internal solid layer A. In the ion selective electrode D, it is preferable to arrange the ion selective film C1 so that it also covers the sides of the internal solid layer A, for example, and to provide side walls so that the internal solid layer A is not exposed.

The reference electrode includes a second internal solid layer and an ionic liquid containing membrane.

The ionic liquid is not limited, for example, the cation is at least one or more of imidazolium cation, pyridinium cation, piperidinium cation, pyrrolidinium cation, quaternary ammonium cation, phosphonium cation or alzonium cation and the anion is $[R^1SO_2NSO\ R_2^2]$—($R^1$ and $R^2$ are each a perfluoroalkyl group of 1 to 5 carbons), borate ion containing fluorine and tetravalent boron, bis(2-ethylhexyl) sulfosuccinate, $AlCl_4^-$, $Al_2Cl_7^-$, $NO_3^-$, $BF_4^-$, $PF_6^-$, $CH_3COO^-$, $CF_3COO^-$, $CF_3SO_3^-$, $(CF_3SO_2)_2N^-$, $(CF_3SO_2)_3C^-$, $AsF_6^-$, $SbF_6^-$, $F(HF)n^-$, $CF_3CF_2CF_2SO_3^-$, $(CF_3CF_2SO_2)_2N^-$, or hydrophobic ionic liquids that are at least one or more of $CF_3CF_2CF_2COO^-$.

It may be preferable that the ionic liquid containing membrane is a gel membrane containing an ionic liquid.

The hydrophobic ionic liquid may be gelated using a polymer compound, although the method of gelation of the hydrophobic ionic liquid is not particularly limited. Such polymeric compounds include, for example, vinylidene fluoride-hexafluoropropylene copolymer, polymethyl methacrylate, polyethyl methacrylate, polyacrylonitrile, polybutyl acrylate, polyvinyl pyridine, organic electrolyte oligomer (main chain Polyvinyl chloride and other synthetic rubbers are examples. A crosslinking agent may be used together with the polymer, such as a gelling agent containing a crosslinking agent having multiple fluoroalkylated sulfonylamide groups and a polymer compound having groups capable of forming onium salts with the crosslinking agent. A plasticizer may also be used together with the polymer. For example, polyvinyl chloride may be mixed with a plasticizer and dried to form a gel. The plasticizer may be the same as the above plasticizers used for ion selective membranes.

The amount of the above components is not limited as long as the ionic liquid containing membrane may function. The content per 100 parts by mass of the ionic liquid containing membrane is, for example, 1-15 parts by mass of the ionic liquid, 15-45 parts by mass of the polymeric compound, and 50-80 parts by mass of the plasticizer. The content of the ionic liquid to 100 parts by mass of the ionic liquid containing membrane is preferably 1 to 10 parts by mass, more preferably 1 to 6 parts by mass, from the viewpoint of suppressing elution of the ionic liquid and further reducing its effect on ion measurements.

The layer structure of the ionic liquid containing membrane is not limited. The layer may be a monolayer structure consisting of one layer of a single composition or a multilayer structure consisting of multiple layers of the same or different compositions from each other.

Figure 11:
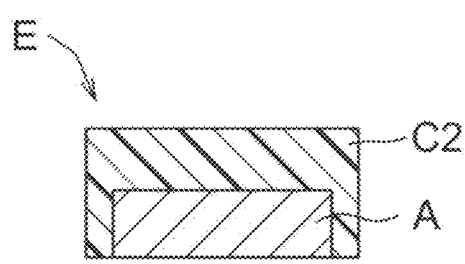
FIG. 11 is a diagram illustrating a schematic cross-sectional view showing an example of a reference electrode.

The ionic liquid containing membrane is provided on the internal solid layer. It may be preferable that the ionic liquid containing membrane is placed directly on the internal solid layer. A reference electrode is shown in FIG. 11. In FIG. 11, the reference electrode E may include a two-layer structure, in which the ionic liquid containing membrane C2 is placed directly on the internal solid layer A. In the reference electrode E, it is preferable to arrange the ionic liquid containing film C2 so that it also covers the sides of the internal solid layer A, for example, and to provide side walls on the sides, so that the internal solid layer A is not exposed.

The ion selective electrode and the reference electrode may function as electrodes as long as the conductive material is contained in the internal solid layer. From the viewpoint of enhancing or imparting functionality as an electrode, it is preferred that the ion selective and reference electrodes contain an electrode material.

The electrode material is not particularly limited as long as it contains a conductive material. Examples of conductive materials include metals such as platinum, gold, silver, copper, palladium, chromium, aluminum, nickel, etc., carbon, substances containing at least one of these metals and/or carbon (such as alloys), and metal halides such as chlorides of these metals. Among these, platinum, gold, silver, palladium, aluminum, nickel, carbon, etc. are preferably mentioned. The conductive material may be one type alone or a combination of two or more types.

The amount of conductive material is, for example, 70 to 100 parts by mass, preferably 85 to 100 parts by mass, more preferably 95 to 100 parts by mass to 100 parts by mass of the electrode material.

The shape of the electrode material is not limited, but may be usually flat.

The layer structure of the electrode material is not particularly restricted. The electrode material may have a monolayer structure consisting of one layer of a single composition, or a multilayer structure consisting of multiple layers of the same or different compositions from each other.

The thickness of the electrode material (=length in the direction perpendicular to the widest surface of the electrode material) is not particularly limited as long as it may further improve or impart functionality as an electrode. The thickness is, for example, 1 to 10 μm. From the viewpoint of manufacturing efficiency, manufacturing cost, etc., the thickness is preferably 1 to 5 μm.

Figure 12:
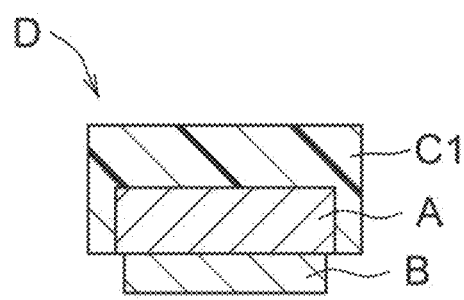
FIG. 12 is a diagram illustrating a schematic cross-sectional view showing an example of an ion selective electrode.
Figure 13:
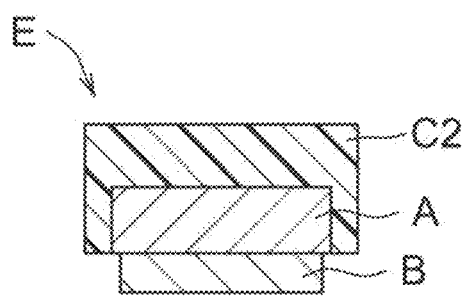
FIG. 13 is a diagram illustrating a schematic cross-sectional view showing an example of a reference electrode.

When the electrode (ion selective electrode, reference electrode) contains an electrode material, an internal solid layer is usually provided directly on the electrode material or via other layers. In this case, it may be preferable that the internal solid layer is placed directly on the electrode material. An ion selective electrode when including the electrode material is shown in FIG. 12. In FIG. 12, the ion selective electrode D may include a three-layer structure, comprising an internal solid layer A directly on the electrode material B and an ion selective membrane C1 directly on the surface of the internal solid layer A opposite to the electrode material B. The reference electrode when including the electrode material is shown in FIG. 13. In FIG. 13, the reference electrode E may include a three-layer structure, consisting of an internal solid layer A directly on the electrode material B and an ionic liquid containing membrane C2 directly on the surface of the internal solid layer A opposite to the electrode material B. In these electrodes, it is preferable to arrange the internal solid layer A so that the electrode material is not exposed, for example, so that the internal solid layer A also covers the side of the electrode material B, and a side wall is provided.

The ion sensor of one or more embodiments may be an all-solid-state ion sensor that does not use an internal liquid for either the ion selective electrode or the reference electrode.

The ion sensor of one or more embodiments includes an ion selective electrode, a reference electrode, and an insulator.

The insulator is not limited as long as it contains an insulating material that does not affect the conductivity of the electrode. Examples of insulating materials include polyvinyl alcohol, polyester resins such as polyethylene terephthalate, polybutylene terephthalate, polyethylene naphthalate, polybutylene naphthalate, polyimide, glass epoxy resin, fiber base materials such as glass, ceramic, paper, etc.

Figure 14:
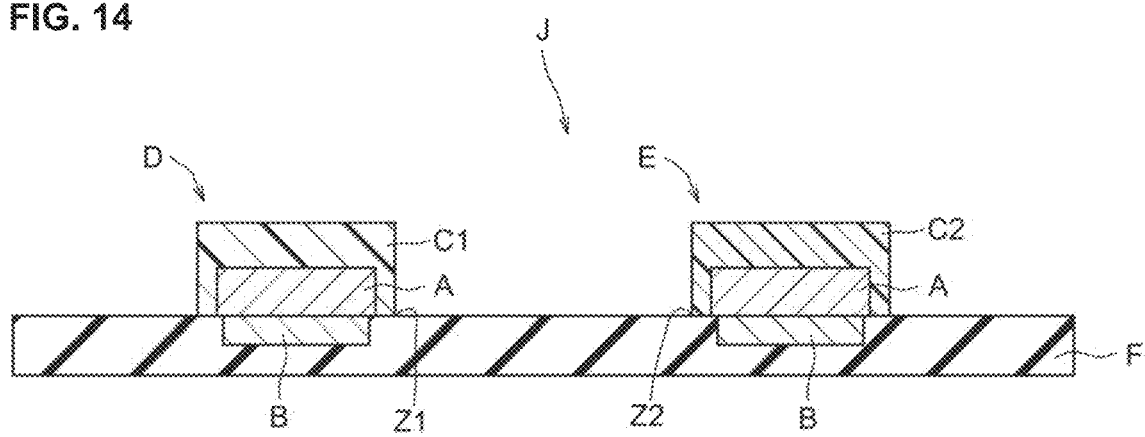
FIG. 14 is a diagram illustrating a schematic cross-sectional view of an example of an ion sensor.

In the ion sensor of one or more embodiments, the ion selective electrode and the reference electrode are arranged on an insulator. A schematic cross-sectional view of the ion sensor of one or more embodiments is shown in FIG. 14. In FIG. 14, the ion selective electrode D and the reference electrode E are arranged on the insulator F.

In the ion sensor of one or more embodiments, the distance between the ion selective electrode and the reference electrode (i.e., the shortest distance between the end of the ion selective electrode and the end of the reference electrode. For example, in the cross-sectional view of FIG. 14, it is the distance between the end Z1 of the ion selective electrode and the end Z2 of the reference electrode E.) is preferably 2 mm or more from the viewpoint of further suppressing the potential change in the ion measurement. The distance is more preferably 3 mm or more, even more preferably 4 mm or more, and even more preferably 5 mm or more. The upper limit of the distance should be such that less of the same specimen may be in contact with both the ion selective and reference electrodes simultaneously, and in this regard, for example, 20 mm, 15 mm, 10 mm, 8 mm, or 6 mm.

The ion selective electrode and the reference electrode should be located on the same side of the insulator. In FIG. 14, the ion selective electrode D and the reference electrode E are located on the same side of the insulator F.

The ion sensor of one or more embodiments may have a single ion selective electrode, or it may have two or more ion selective electrodes (e.g., 2-5). The ion sensor of one or more embodiments may also have a single reference electrode, or it may have two or more reference electrodes (e.g., 2-5).

It may be preferable that the ion sensor of one or more embodiments is used as a potassium ion sensor. While hyperkalemic patients are likely to experience fluctuations in the electrical activity of the heart to the extent that abnormalities appear in the electrocardiogram and possibly fatal arrhythmias due to actions that increase blood potassium, such as excessive consumption of a high-potassium diet, medication, dialysis, etc. without a high blood potassium level cause an excessive medication, dialysis, etc. without high blood potassium levels may cause an excessive drop in blood potassium, which may lead to paralysis, muscle spasms, and in some cases, death. Since blood potassium levels vary depending on the patient's constitution, pathological condition, daily diet, etc., it is desirable that the timing of medication, dosage, diet, etc., may be adjusted appropriately based on the patient's own measurement of blood potassium levels so as not to cause excessive decreases or increases in blood potassium levels. The ion sensor of one or more embodiments is an ion sensor with reduced potential variation and less need for calibration (it may also be calibration free), so it may be used for measurements by hyperkalemia patients (usually a complicated and specialized task such as calibration is difficult). It is particularly suitable as a potassium ion sensor.

Figure 16:
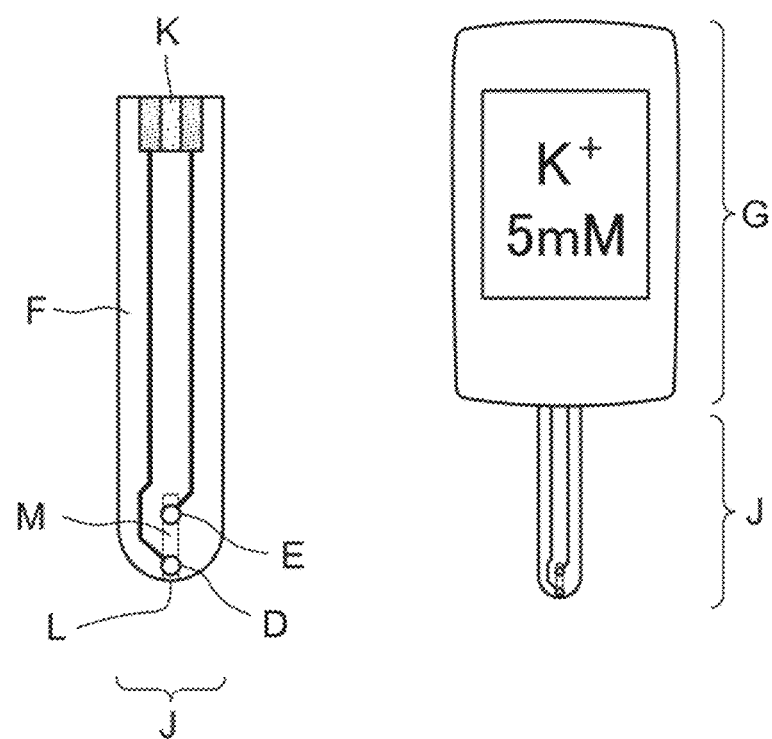
FIG. 16, on the left, is a diagram illustrating a schematic plan view of an example of an ion sensor according to one or more embodiments. The figure on the right is a diagram illustrating a schematic plan view showing an example of a use of an ion sensor according to one or more embodiments.

FIG. 16 shows an example of the use of the ion sensor J of one or more embodiments. By setting ion sensor J, in which ion selective electrode D and reference electrode E are arranged on insulator F, in a separately prepared potentiometer G, as shown on the right side of FIG. 16, ion concentration may be measured. Specifically, by connecting the connection terminal K of the ion sensor J to the connection terminal in the potentiometer G and bringing the tip L of the ion sensor J connected to the potentiometer G into contact with blood, blood is aspirated through the flow path M by capillary action. The aspirated blood comes into contact with the ion selective electrode D and the reference electrode E. The potential difference is measured by the potentiometer G and the ion concentration is calculated. The ion sensor J may be disposed of after measurement as a disposable ion sensor.

2. Method for Manufacturing an Ion Sensor

A method of manufacturing an ion sensor according to one or more embodiments may include: forming an ion selective electrode including a first internal solid layer containing a first insertion material and a first ion conductive ceramic, and an ion selective membrane; forming a reference electrode including a second internal solid layer containing a second insert material and a second ion conductive ceramic and an ionic liquid containing membrane on an insulator.

The method of forming the electrode (ion selective electrode, reference electrode) is not particularly limited. It may be preferable that the electrode is produced by a method including forming an internal solid layer containing an insulating material and ion conductive ceramic on an insulator (or on an electrode material formed on an insulator), and forming an ion selective film/ion liquid containing film on the internal solid layer.

The method of forming the internal solid layer is not particularly limited. It may be preferable that the internal solid layer may be formed by depositing and drying a composition containing an insertion material and ion conductive ceramic (preferably in a mixed state) on an insulator (or on electrode material formed on an insulator). Electrostatic coating, dispensing, screen printing, sputtering, evaporation, hot pressing, etc. may be employed as the deposition method, but electrostatic coating is preferred from the viewpoint that it may improve the adhesion between the insulating material and ion conductive ceramic.

Methods similar to the above may be employed to form other layers such as ion selective films and ionic liquid containing films. That is, a composition (paste, solution, etc.) containing each component of the layer may be formed by depositing and drying a film on the internal solid layer.

3. Method for Measuring Ions

A method for measuring ions using the ion sensor according to one or more embodiments may include contacting a specimen with an ion selective electrode and a reference electrode, and measuring the potential between the ion selective electrode and the reference electrode.

The specimen is an object to be measured for ions and may be a liquid, semi-solid, or the like, with no particular restrictions as long as it may contain ions. The specimen may be, for example, body fluid or a substance that retains body fluid. Examples of body fluids include whole blood, serum, plasma, transit blood, saliva, urine, tissue fluid, sweat, tears, saliva, etc. Other examples of specimens include, for example, food and drink.

Figure 15:
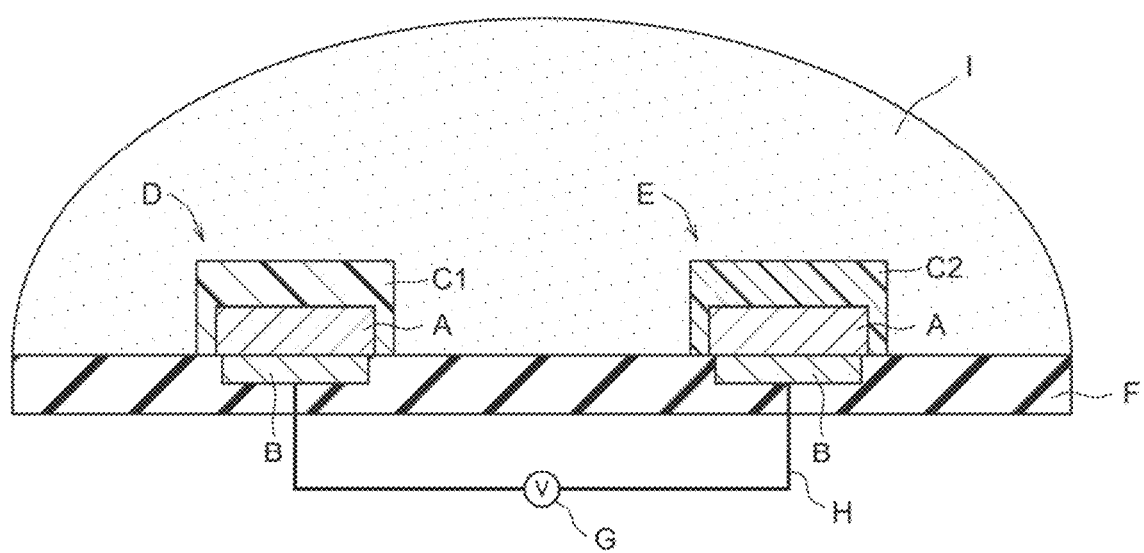
FIG. 15 is a schematic diagram illustrating an example of how an ion sensor is used to measure ions in a specimen.

The potential may be measured according to or in accordance with known methods. For example, as shown in FIG. 15, a potentiometer G may be placed between the ion selective electrode D and the reference electrode E via a conductor H to measure the potential. The potential is measured with the specimen I in contact with the ion selective electrode D and the reference electrode E. Based on the measurements obtained, the ion concentration in specimen I may be calculated.

In one or more embodiments, the process of bringing the specimen into contact may include supplying the specimen onto the ion sensor.

In one or more embodiments, it is also preferred that the specimen be allowed to flow from the position where the ion selective electrode is located toward the position where the reference electrode is located, in order to deter the ionic liquid from contacting the ion selective electrode and to further reduce the potential change in the ion measurement. In one or more embodiments, the specimen is first brought into contact with the ion selective electrode, and then the flow of the specimen from the ion selective electrode toward the reference electrode may bring the specimen into contact with the reference electrode as well. The power of the flow of the specimen is not restricted as long as it does not significantly affect the potential measurement, e.g., capillary action, gravity, etc.

Since the ion sensor of one or more embodiments is an ion sensor with reduced potential variation and a lower need for calibration (it may also be calibration free), the measurement method of one or more embodiments using it is particularly suitable for monitoring and measuring blood potassium levels by hyperkalemia patients themselves. The method of measurement is particularly suitable for the monitoring of blood potassium levels by hyperkalemia patients themselves.

EXAMPLES

Examples are Described in Detail Below, but One or More Embodiments are not Limited by these Examples.

Example 1: Structure and Fabrication Method of Ion Sensor

Figure 1B:
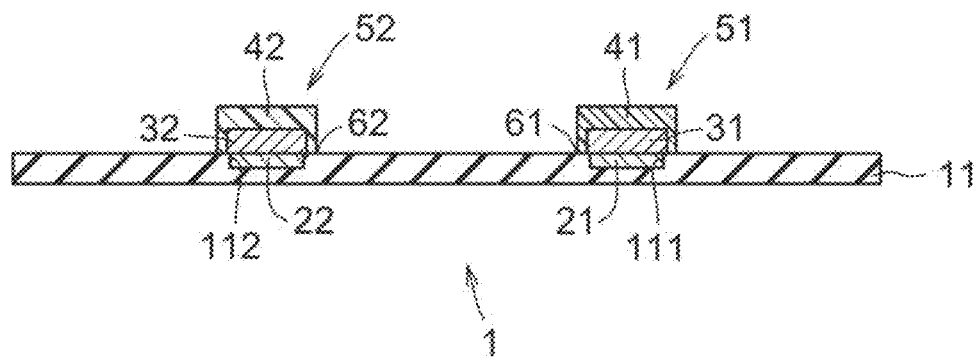
FIG. 1B is a diagram illustrating a cross-sectional view of an ion sensor obtained in Example 1.

The structure of the ion sensor is described using FIGS. 1A and 1B. FIG. 1A shows a plan view of the ion sensor obtained in Example 1, and FIG. 1B shows a cross-sectional view of the ion sensor along the 1B-1B" line in FIG. 1A. The ion sensor 1 may include an ion selective electrode 52 and a reference electrode 51 provided at opposite positions of recesses 112 and 111, respectively, formed on the same side of the alumina substrate 11, which is an insulator. The ion selective electrode 52 may include a structure in which the platinum electrode 22, the internal solid layer 32, and the ion selective membrane 42 are arranged on the alumina substrate 11, in order from closer to the alumina substrate 11. The reference electrode 51 may include a structure in which the platinum electrode 21, the internal solid layer 31, and the ionic liquid containing membrane 41 are arranged on the alumina substrate 11, in order from the one nearest to the alumina substrate 11. The platinum electrodes 21 and 22 are embedded in recesses 111 and 112 and have a circular diameter of 1.7 mm (ø1.7 mm) in top view. Ion selective membrane 42 is provided on alumina substrate 11 to cover the top and sides of internal solid layer 32. The ionic liquid containing membrane 41 is provided on the alumina substrate 11 so as to cover the top and sides of the internal solid layer 31. The distance between the inner end 62 of the ion selective electrode 52 and the inner end 61 of the reference electrode 51 is 5.6 mm. The total thickness of the internal solid layer 32 (about 15 μm thick) and the ion selective membrane 42 (about 15 μm thick) is about 30 μm, and the total thickness of the internal solid layer 31 (about 15 μm thick) and the ionic liquid-containing membrane 41 (about 15 μm thick) is about 30 μm. When recesses 112 and 111 are formed on the same side of the alumina substrate 11, it is easier to fabricate the ion selective electrode 52 and reference electrode 51 according to their shapes. The ion sensor 1 may have the ion selective electrode 52 and the reference electrode 51 arranged on the alumina substrate 11 without the recesses 112 and 111.

Next, the fabrication method of the ion sensor is described. Insertion material ($Na_{0.33}MnO_2$ (tetragonal crystal structure, average grain size 8.9 μm, scaly)), ion conductive ceramic (β" alumina: $Na_2Al_{10.6}O_{15.9}$, average grain size 0.26 μm), conductive agent (acetylene black), binding agent (polyvinylidene fluoride), and solvent 1-methyl-2-pyrrolidone is mixed in a composition ratio of insertion material:ion conductive ceramic:conductive agent:binding agent=8:8:1:1 to prepare the material for the internal solid layer 31 and internal solid layer 32. The prepared materials are laminated on each of the platinum electrode 21 and platinum electrode 22 on the alumina substrate 11 by electrostatic application, in which the materials are applied to the target by electrostatic force, and then completely dried in a vacuum drying oven to prepare the internal solid layer 31 and the internal solid layer 32.

After forming the internal solid layer 31 and the internal solid layer 32 on the alumina substrate 11, 3 parts by mass of ionophore (valinomycin), 67.9 parts by mass of plasticizer (tris (2-ethylhexyl)phosphate), 67.9 parts by mass of anion eliminating agent (potassium tetrakis (4-chlorophenyl)borate) 0.3 mass parts, and a tetrahydrofuran solution containing 28.8 mass parts of a binder resin (polyvinyl chloride) are laminated and dried to form an ion selective membrane 42 to obtain an ion-selective electrode 52.

Next, on the internal solid layer 31, 4 parts by mass of ionic liquid ([TBMOEP$^+$][$C_1C_1N^-$]: tributyl (2-methoxyethyl) phosphonium bis (trifluoromethanesulfonyl) imide), 64 parts by mass of plasticizer (tris (2-ethylhexyl) phosphate) and polymer compound for gelation (A tetrahydrofuran solution containing 32 mass parts of polyvinyl chloride (polyvinyl chloride) is layered and dried to form an ionic liquid containing membrane 41 as an ionic liquid containing membrane to obtain a reference electrode 51.

The cross-sectional morphology of the reference electrode 51 is analyzed by field emission scanning electron microscopy (FE-SEM, S-4800, Hitachi High-Technologies Corporation) and energy dispersive X-ray spectroscopy (EDS, XFlash 6130, Bruker AXS).

Figure 2:
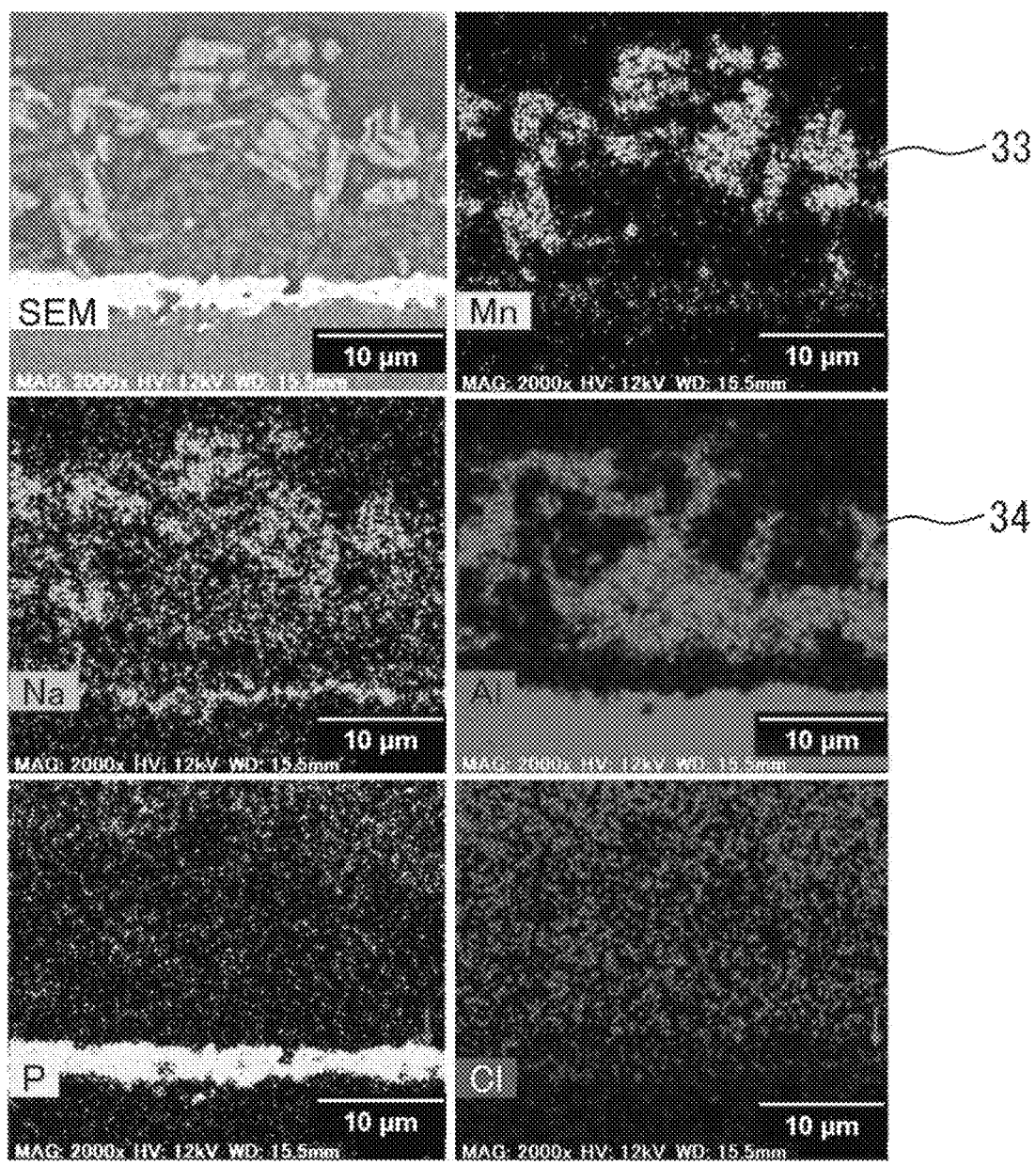
FIG. 2 is a diagram illustrating a scanning electron microscope (SEM) image of a reference electrode of an ion sensor obtained in Example 1 and an elemental distribution map using an energy dispersive X-ray spectrometer (EDS: Energy Dispersive X-ray Spectrometer) of the SEM image.

A scanning electron microscope (SEM) image of the reference electrode 51 and an elemental distribution diagram using an energy dispersive X-ray spectrometer (EDS) of the SEM image are shown in FIG. 2. The insertion material 33, $Na_{0.33}MnO_2$, shows the elemental distribution of Mn and Na, the ion conductive ceramic 34, β" alumina, shows the elemental distribution of Al and Na, the plasticizer tris (2-ethylhexyl) phosphate shows the elemental distribution of P, the polymer compound for gelation, polychlorinated Comparing the elemental distribution of Mn and Al, it may be seen that Al (i.e. ion conductive ceramic 34) is distributed around the Mn distribution area (i.e. insertion material 33), which confirms that ion conductive ceramic 34 covers the area around the insertion material 33. In addition, due to the exchange of $Na^+$ between the insertion material 33 and the ion conductive ceramic 34, the plasticizer must be between the insertion material 33 as in the ion selective electrode 52, but in the elemental distribution of P and Cl, P and Cl are relatively uniformly distributed in the elemental distribution of P and Cl The fact that the plasticizer and the polymeric compound for gelation entered the gaps between the 33 insertion materials as designed was confirmed.

Example 2: Potential Difference Measurement with Ion Sensor 1

Figure 3:
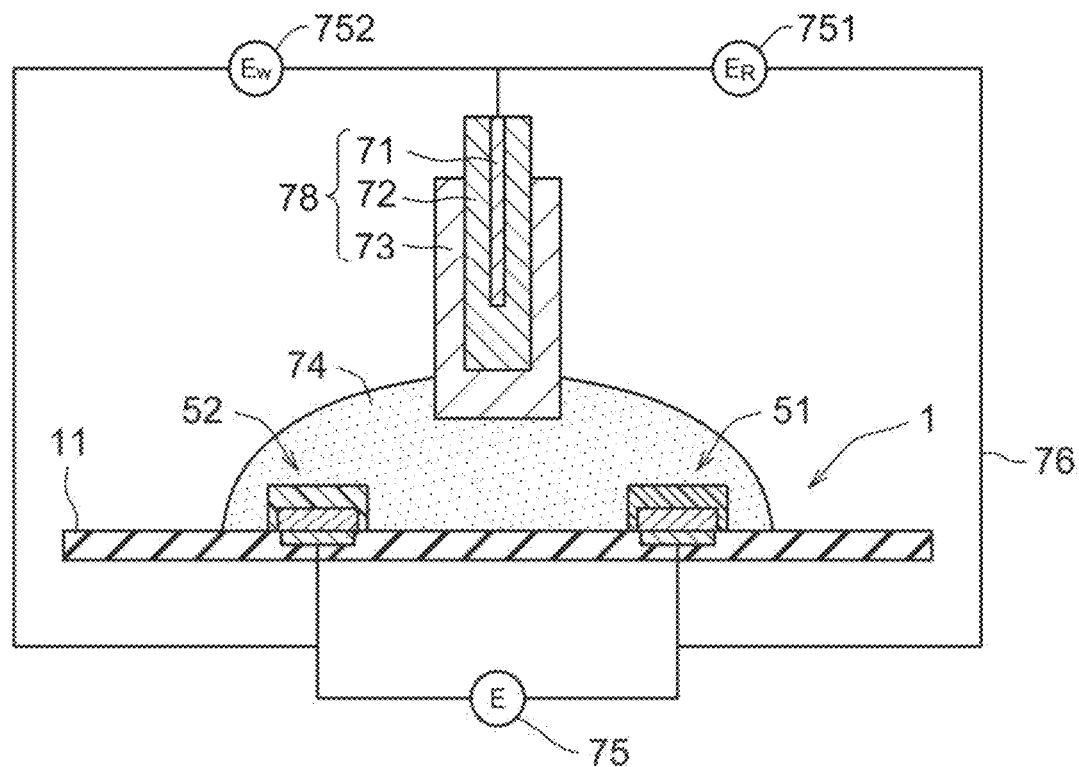
FIG. 3 is a diagram illustrating an open circuit potential measurement of Example 2.

The open circuit potential of each of the ion selective electrode 52 and reference electrode 51 of ion sensor 1 (Example 1) was measured for 3 minutes against the Ag/AgCl reference electrode 78 (saturated KCl, double junction NaCl 140 mmol $dm^{-3}$), as shown in FIG. 3. Specifically, the ion selective electrode 52 and the reference electrode 51 are connected via potentiometer 75, and the potentials between the ion selective electrode 52 and the Ag/AgCl reference electrode 78 and between the reference electrode 51 and the Ag/AgCl reference electrode 78 were also connected via potentiometers 752 and 751. In the evaluation of ion sensor 1, in which the ion selective electrode 52 and the reference electrode 51 are integrated on the same surface of the alumina substrate 11, the potential (E) between the ion selective electrode 52 and the reference electrode 51 is calculated by subtracting the potential of the reference electrode 51 ($E_R$) from the potential of the ion selective electrode 52 ($E_W$), where $E_R$ and $E_W$ are respectively the Ag/AgCl reference electrode 78 and were measured between the two electrodes. For each measurement, the sample solution was dropped onto the sensor in a dry state without prior conditioning (the process of bringing the electrode into contact with a solution containing the ion to be measured (potassium ion) for a certain period of time), and the average values of 50 to 60, 110 to 120, and 170 to 180 seconds are measured for 1, 2, and 3 minutes, respectively. The sample solutions for KCl measurements contains KCl 1, 10, 100 mmol $dm^{-3}$ and NaCl electrolytes of 140 mmol $dm^{-3}$. For serum measurements, serum standard solutions (JCTCM 130-4) Low (L), Middle (M), and High (H) are obtained, and samples of other concentration levels are prepared by mixing L and M or M and H. Table 1 shows the concentration of each ion in the serum samples.

TABLE 1

| | ION CONCENTRATION/mmol $dm^{-3}$ | | |
|---|---|---|---|
| | $K^+$ | $Na^+$ | $Cl^-$ |
| SERUM SAMPLES | 3.37 | 124.5 | 89.5 |
| | 3.91 | 133.0 | 97.9 |
| | 4.37 | 140.4 | 105.1 |
| | 4.93 | 147.9 | 112.8 |
| | 5.42 | 154.4 | 119.4 |

Figure 4:
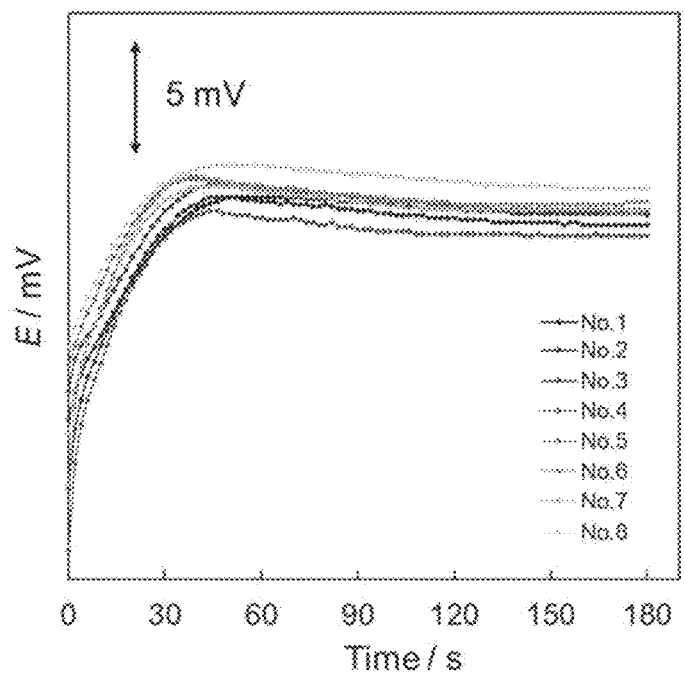
FIG. 4 is a diagram illustrating a potential response time curves of eight reference electrodes independently fabricated by the same method.

The potentiometric response of eight reference electrodes 51 (each of which was independently fabricated using the same method) measured using 10 mmol $dm^{-3}$ KCl and 140 mmol $dm^{-3}$ NaCl solutions and an Ag/AgCl reference electrode 78 is shown in FIG. 4. From the potential response waveform, the response time was about 45 s (FIG. 4). The reproducibility of the standard potential (E°) between the eight sensors was very good with a standard deviation of ±0.6 mV at 1 min, ±0.7 mV at 2 min, and ±0.6 mV at 3 min (Table 2). Also, in the presence of 1-100 mmol $dm^{-3}$ of $K^+$, the electrode potential was ±0.3 mV standard deviation, indicating that the measured potential of the reference electrode 51 is independent of the KCl concentration (Table 3).

TABLE 2

| | POTENTIAL/mV | | | | | | | | |
|---|---|---|---|---|---|---|---|---|---|
| MEASUREMENT TIME | No. 1 | No. 2 | No. 3 | No. 4 | No. 5 | No. 6 | No. 7 | No. 8 | STANDARD DEVIATION (n = 8) |
| 1 MIN. | 131.9 | 131.8 | 132.3 | 131.1 | 132.5 | 132.4 | 132.3 | 133.3 | ±0.6 |
| 2 MIN. | 131.4 | 131.0 | 131.6 | 130.3 | 131.6 | 131.7 | 131.4 | 132.6 | ±0.7 |
| 3 MIN. | 131.2 | 130.7 | 131.2 | 130.2 | 131.2 | 131.7 | 131.4 | 132.3 | ±0.6 |

TABLE 3

| MEASUREMENT ORDER | K+ CONCENTRATION/ mmol $dm^{-3}$ | AVERAGE POTENTIAL OF EIGHT REFERENCE ELECTRODES 51/mV | STANDARD DEVIATION OF POTENTIAL OF EIGHT REFERENCE ELECTRODES 51/mV |
|---|---|---|---|
| $1^{st}$ | 10 | 131.2 | ±0.6 |
| $2^{nd}$ | 100 | 130.5 | ±0.8 |
| $3^{rd}$ | 1 | 131.2 | ±0.5 |
| $4^{th}$ | 10 | 130.4 | ±0.5 |
| STANDARD DEVIATION OF POTENTIAL OF 4 TYPES OF POTASSIUM CONCENTRATION | | ±0.5 | |

Example 3: Potential Difference Measurement with Ion Sensor 2

To evaluate the validity of the 5.6 mm distance between the electrodes of ion sensor 1, ion sensor 1 (Example 1) and ion sensor 2 (FIG. 5), which may include the same configuration as ion sensor 1 (Example 1) except without the reference electrode 51, were prepared. The open circuit potential of the ion selective electrode of each of ion sensor 1 and ion sensor 2 was measured for 3 minutes against the Ag/AgCl reference electrode 78 in the same manner as in Example 2 (FIG. 3) to obtain a calibration curve and evaluate whether parameters such as slope, standard potential, selectivity (Kpot $K^+$, $Na^+$) differ between the two.

The results are shown in Table 4. Table 4 shows the mean values and standard deviations of 1) slope, 2) standard potential, and 3) selectivity coefficients obtained separately for the two types of ion sensors (mean±standard deviation) for three measurements each of ion sensor 2 without reference electrode 51 and ion sensor 1 with reference electrode 51. The K+ concentrations of the sample solutions were 1, 10, and 100 mmol $dm^3$ for KCl solutions containing 140 mmol $dm^3$ of NaCl, and the three solutions were measured by dropping three different solutions on one sensor in order from the lowest concentration.

TABLE 4

| | | SLOPE/mV/decade | STANDARD POTENTIAL/mV | SELECTIVE COEFFICIENT $10^3 \times K^{pot}_{K+, Na+}$ |
|---|---|---|---|---|
| ION-SELECTIVE ELECTRODE | WITH REFERENCE ELECTRODE 51 | 54.3 ± 0.1 | 320.5 ± 0.5 | 1.7 ± 0.1 |
| | W/O REFERENCE ELECTRODE 51 | 53.3 ± 0.8 | 320.0 ± 2.1 | 1.8 ± 0.1 |
| | SIGNIFICANT DIFFERENCE | NO | NO | NO |

There are no significant differences in slope, potential, or selectivity with or without reference electrode 51 (Table 4).

Example 4: Potential Difference Measurement with Ion Sensors 3

To check whether Ion Sensor 1 (Example 1) may be used as a disposable sensor for calibration free measurements, KCl solutions were measured once with one Ion Sensor 1 (Example 1) and calibration curves were obtained. Three ion sensor 1s were used for each solution, for a total of 15 ion sensor 1s. These 15 ion sensors 1 were independently fabricated by the same method.

The calibration curve of the ion selective electrode 52 relative to the reference electrode 51 during the measurement of KCl solution is shown in FIG. 6A The slope at 1-100 mmol $dm^{-3}$ of KCl was 53.2 mV/decade and the linearity was good with R2=0.999.

Non-patent literature discloses a potential variation (standard deviation) of 4.3 mV when KCl solution was measured without electrode conditioning (electrode immersed in 1 mM KCl solution for 24 hours) using an all solid-state ion sensor ((1) shown in FIG. 6C). Note that when the KCl solution was measured after conditioning (electrode immersed in 1 mM KCl solution for 24 hours), the potential variation (standard deviation) was 14 mV, indicating a larger variation. In addition, the variation of potential (standard deviation) allowed in the case of potassium ion measurement in the U.S. Federal regulation, 42 CFR § 493.931—Routine chemistry, is 2.3 mV ((2) shown in FIG. 6C). Therefore, the standard deviation of the potential in this case (0.4-1.3 mV) is below the permissible value in the US federal regulation 42 CFR § 493.931—Routine chemistry, and is also very good, lower than the standard deviation of the conventional technology for all solid-state ion sensors (FIG. 6B).

Example 5: Potentiometric Measurements with Ion Sensors 4

The performance of ion sensor 1 (Example 1) was tested with a series of serum samples of blood with different concentrations of $K^+$, $Na^+$, $Cl^-$ as shown in Table 1.

The calibration curve of ion sensor 1 for the serum samples is shown in FIG. 7($a$). The same ion sensor 1 as in Example 1 was used to measure the relationship between the potential value E of the ion selective electrode 52 and the reference electrode 51. The slope of the response to serum specimen was 51.7 mV/decade, which was not significantly different from the slope of the response observed in the range of KCl 1-10 mmol $dm^{-3}$ of 51.2 mV/decade.

Non-patent literature reported a potential variation (standard deviation) of 4.4 mV when 10% serum was measured without electrode conditioning (electrode immersed in 1 mM KCl solution for 24 hours) using an all solid-state ion sensor ((1) shown in FIG. 7C). In addition, when 10% serum was measured after conditioning (immersion of the electrode in 1 mM KCl solution for 24 hours), the variation in potential (standard deviation) is 19 mV, indicating that the variation is widened. In addition, the variation of potential (standard deviation) allowed in the case of potassium ion measurement in the U.S. federal regulation, 42 CFR § 493.931—Routine chemistry, is 2.3 mV ((2) shown in FIG. 7C). Therefore, the standard deviation of the potential in this case (0.2-2.2 mV) is below the permissible value in the US federal regulation, 42 CFR § 493.931—Routine chemistry, and is also very good values, lower than the standard deviation of conventional technology for all solid-state ion sensors as shown in FIG. 7B.

Example 6: Potential Difference Measurement with Potassium Ion Sensor 5

Figure 8:
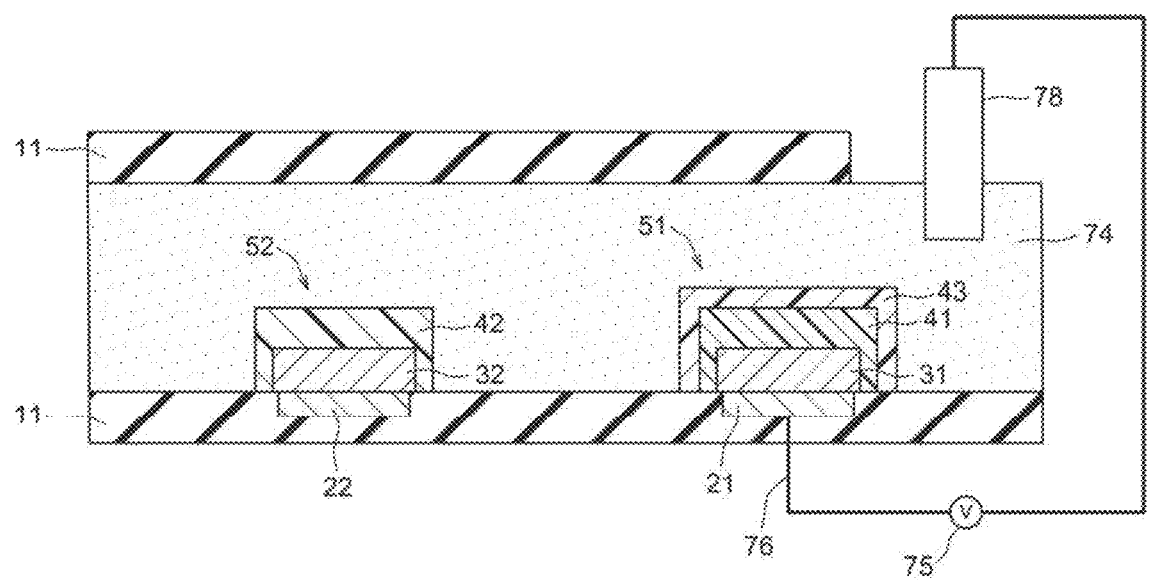
FIG. 8 is a diagram illustrating a method for measuring ions using an ion sensor in Example 6.

Measurement is performed in the system shown in FIG. 8, using ion sensor 3 (Example 6), in which an ion liquid containing membrane of 70 mass % ionic liquid 43 was further laminated on the ionic liquid containing membrane 41 of ion sensor 1 (Example 1). Specifically, a reference electrode 51 and an Ag/AgCl reference electrode 78 were connected via a potentiometer 75, and the potential was measured.

Figure 9:
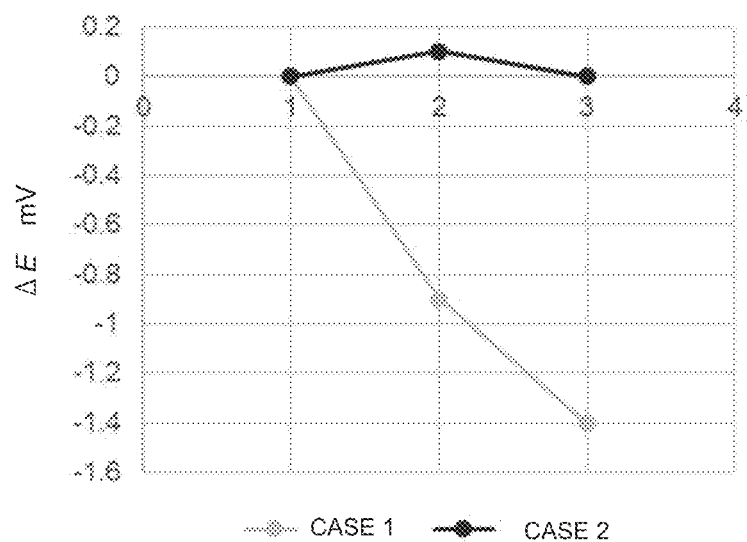
FIG. 9 is a diagram illustrating a measurement of a potential E to an ion selective electrode in Example 6. The horizontal axis shows the time (minutes) elapsed since the solution contacted the sensor and stopped. The vertical axis shows the potential difference relative to the measurement after 1 minute.

100 μL of a solution of KCl 1 mmol $dm^{-3}$ is used as the measurement solution, and the potential of the reference electrode 51 with respect to the Ag/AgCl reference electrode 78 is measured for 3 minutes after the solution stopped contacting the ion sensor 1. FIG. 9 shows the 3-minute potential change ΔE (potential difference relative to the measured value after 1 minute) when the measured solution flowed from the reference electrode 51 side with the ionic liquid containing membrane 41 stacked to the ion selective electrode 52 side (Case 1) and when the measured solution flowed from the ion selective electrode 52 side to the reference electrode 51 side (Case 2). In Case 2, the potential was stable for 3 minutes, whereas in Case 1, the ionic liquid dissolved in the solution affected the membrane of the ion selective electrode 52, causing the potential to gradually decrease.

As a supplementary note, an ion sensor, a method for manufacturing an ion sensor, and a method for measuring ions. according to one or more embodiments are summarized.

An ion sensor comprising:
 an ion selective electrode comprising:
  a first internal solid layer comprising:
   a first insertion material; and
   a first ion conductive ceramic; and
  an ion selective membrane provided on the first internal solid layer;
 a reference electrode comprising:
  a second internal solid layer comprising:
   a second insertion material; and
   a second ion conductive ceramic; and
  an ionic liquid containing membrane provided on the second internal solid layer; and
 an insulator on which the ion selective electrode and the reference electrode are arranged.

In the ion sensor, the first ion conductive ceramic and the second ion conductive ceramic comprise potassium ion conductive ceramic, sodium ion conductive ceramic, or lithium ion conductive ceramic.

In the ion sensor, the first ion conductive ceramic and the second ion conductive ceramic comprise β" alumina or β alumina.

In the ion sensor, the first and second insertion materials comprise metal oxides, oxygen redox materials, or Prussian blue analogues.

In the ion sensor, the first and second insertion materials comprise ion electron conductors.

In the ion sensor, the first insertion material and the second insertion material comprise ion electron conductors for potassium ions, sodium ions, or lithium ions.

In the ion sensor, the first insertion material and the second insertion material comprise a metal oxide.

In the ion sensor, the metal oxide comprises $M_x MnO_2$ (M denotes Na or K and x denotes any positive number).

In the ion sensor, the x is between 0.2 and 0.5.

In the ion sensor, the ion selective electrode and the reference electrode comprise an electrode material.

In the ion sensor, the first insertion material, the second insertion material, the first ion conductive ceramic and the second ion conductive ceramic comprise particles.

In the ion sensor, an average particle size of the first ion conductive ceramic is smaller than the average particle size of the first insertion material, and
 an average particle size of the second ion conductive ceramic is smaller than the average particle size of the second insertion material.

In the ion sensor,
 a mass ratio of the first insertion material to the first ion conductive ceramic and a mass ratio of the second insertion material to the second ion conductive ceramic is 2:1 to 1:2.

In the ion sensor, the first internal solid layer and the second internal solid layer comprise a binding agent and a conductive agent.

In the ion sensor, the binding agent comprises one of:
(a) polyvinylidene fluoride,
(b) a mixture containing styrene butadiene latex and carboxymethyl cellulose,
(c) a mixture containing polyamide, polyimide, and carbodiimide,
(d) polytetrafluoroethylene, or
(e) acrylic emulsion.

In the ion sensor, the conductive agent comprises carbon black, acetylene black, Ketjen black, carbon nanotubes, graphene, carbon powder, or graphite powder.

In the ion sensor, the ion selective membrane comprises ionophores.

In the ion sensor, the ionic liquid containing membrane comprises a gel membrane that comprises an ionic liquid. a composition of the first internal solid layer and a composition of the second internal solid layer are substantially the same.

In the ion sensor, the ion selective electrode and the reference electrode are arranged on a same side of the insulator.

A method of manufacturing an ion sensor, comprising:
 forming a selective electrode on an insulator, the selective electrode comprises:
  a first internal solid layer comprising:
   a first insertion material; and
   a first ion conductive ceramic; and
  an ion selective membrane provided on the first internal solid layer;
 forming a reference electrode on the insulator, the reference electrode comprises:
  a second internal solid layer comprising:
   a second insertion material; and
   a second ion conductive ceramic; and
  an ionic liquid containing membrane.

In the method, the forming the first internal solid layer and the second internal solid layer comprises electrostatic application.

A method of measuring ion ions using the ion sensor above, including
 contacting a specimen with the ion selective electrode and the reference electrode; and
 measuring an electric potential between the ion selective electrode and the reference electrode.

In the method, the contacting the specimen with the ion selective electrode and the reference electrode comprises supplying the specimen onto the ion sensor.

In the method, the contacting the specimen with the ion selective electrode and the reference electrode comprises allowing the specimen to flow from a position where the ion selective electrode is arranged to a position where the reference electrode is arranged.

The invention claimed is:

1. An ion sensor comprising:
 an ion selective electrode comprising:
  a first internal solid layer comprising:
   a first insertion material; and
   a first ion conductive ceramic; and
  an ion selective membrane provided on the first internal solid layer;
 a reference electrode comprising:
  a second internal solid layer comprising:
   a second insertion material; and
   a second ion conductive ceramic; and an ionic liquid containing membrane provided on the second internal solid layer; and
an insulator on which the ion selective electrode and the reference electrode are arranged, wherein
the first insertion material, the second insertion material, the first ion conductive ceramic and the second ion conductive ceramic comprise particles,
a ratio of an average particle size of the first ion conductive ceramic to an average particle size of the first insertion material is 0.001 or more and 0.3 or less,
a ratio of an average particle size of the second ion conductive ceramic to an average particle size of the second insertion material is 0.001 or more and 0.3 or less,
the ion-selective membrane has a multi-layer structure including a plurality of layers having different compositions from each other,
the ionic liquid containing membrane has a multi-layer structure including a plurality of layers having different compositions from each other,
the ion selective electrode further comprises a first electrode material on which the first internal solid layer is provided, wherein the first electrode material has a multi-layer structure including a plurality of layers having different compositions from each other, and
the reference electrode further comprises a second electrode material on which the second internal solid layer is provided, wherein the second electrode material has a multi-layer structure including a plurality of layers having different compositions from each other.

2. The ion sensor according to claim 1, wherein the first ion conductive ceramic and the second ion conductive ceramic comprise potassium ion conductive ceramic, sodium ion conductive ceramic, or lithium ion conductive ceramic.

3. The ion sensor according to 1, wherein the first ion conductive ceramic and the second ion conductive ceramic comprise β" alumina or β alumina.

4. The ion sensor according to claim 1, wherein the first and second insertion materials comprise metal oxides, oxygen redox materials, or Prussian blue analogues.

5. The ion sensor according to claim 1, wherein the first and second insertion materials comprise ion electron conductors.

6. The ion sensor according to claim 5, wherein the ion electron conductors comprised in the first insertion material and the second insertion material comprise ion electron conductors for conducting potassium ions, sodium ions, or lithium ions.

7. The ion sensor according to claim 1, wherein the first insertion material and the second insertion material comprise a metal oxide.

8. The ion sensor according to claim 7, wherein the metal oxide comprises $M_xMnO_2$, where M denotes Na or K and x denotes any positive number.

9. The ion sensor according to claim 8, wherein the x is between 0.2 and 0.5.

10. The ion sensor according to claim 1, wherein a mass ratio of the first insertion material to the first ion conductive ceramic and a mass ratio of the second insertion material to the second ion conductive ceramic each is 2:1 to 1:2.

11. The ion sensor according to claim 1, wherein the first internal solid layer and the second internal solid layer comprise a binding agent and a conductive agent.

12. The ion sensor according to claim 11, wherein the binding agent comprises one of:
(a) polyvinylidene fluoride,
(b) a mixture containing styrene butadiene latex and carboxymethyl cellulose,
(c) a mixture containing polyamide, polyimide, and carbodiimide,
(d) polytetrafluoroethylene, or
(e) acrylic emulsion.

13. The ion sensor according to claim 11, wherein the conductive agent comprises carbon black, acetylene black, Ketjen black, carbon nanotubes, graphene, carbon powder, or graphite powder.

14. The ion sensor according to claim 1, wherein the ion selective membrane comprises ionophores.

15. The ion sensor according to claim 1, wherein the ionic liquid containing membrane comprises a gel membrane that comprises an ionic liquid.

16. The ion sensor according to claim 1, wherein a composition of the first internal solid layer and a composition of the second internal solid layer are substantially the same.

17. The ion sensor according to claim 1, wherein the ion-selective membrane is provided to cover a top surface and side surfaces of the first internal solid layer such that the first internal solid layer is not exposed, and
the ionic liquid containing membrane is provided to cover a top surface and side surfaces of the second internal solid layer such that the second internal solid layer is not exposed.

18. The ion sensor according to claim 17, wherein the first internal solid layer covers a top surface and side surfaces of the first electrode material, and
the second internal solid layer covers a top surface and side surfaces of the second electrode material.

19. A method of manufacturing an ion sensor, comprising:
forming a selective electrode on an insulator, the selective electrode comprises:
a first internal solid layer comprising:
a first insertion material; and
a first ion conductive ceramic; and
an ion selective membrane provided on the first internal solid layer;
forming a reference electrode on the insulator, the reference electrode comprises:
a second internal solid layer comprising:
a second insertion material; and
a second ion conductive ceramic; and
an ionic liquid containing membrane, wherein
the first insertion material, the second insertion material, the first ion conductive ceramic and the second ion conductive ceramic comprise particles,
a ratio of an average particle size of the first ion conductive ceramic to an average particle size of the first insertion material is 0.001 or more and 0.3 or less,
a ratio of an average particle size of the second ion conductive ceramic to an average particle size of the second insertion material is 0.001 or more and 0.3 or less,
the ion-selective membrane has a multi-layer structure including a plurality of layers having different compositions from each other,
the ionic liquid containing membrane has a multi-layer structure including a plurality of layers having different compositions from each other, the ion selective electrode further comprises a first electrode material on which the first internal solid layer is provided, wherein the first electrode material has a multi-layer structure including a plurality of layers having different compositions from each other, and
the reference electrode further comprises a second electrode material on which the second internal solid layer is provided, wherein the second electrode material has a multi-layer structure including a plurality of layers having different compositions from each other.

* * * * *